United States Patent
Kurata

(10) Patent No.: US 7,864,108 B2
(45) Date of Patent: Jan. 4, 2011

(54) PRESENT POSITION ESTIMATION METHOD, POSITIONING METHOD, PROGRAM, AND MOBILE TERMINAL

(75) Inventor: Tomoyuki Kurata, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 313 days.

(21) Appl. No.: 12/030,686

(22) Filed: Feb. 13, 2008

(65) Prior Publication Data
US 2008/0198068 A1  Aug. 21, 2008

(30) Foreign Application Priority Data
Feb. 15, 2007 (JP) .............................. 2007-035375
Dec. 28, 2007 (JP) .............................. 2007-338825

(51) Int. Cl.
*G01S 19/06* (2010.01)
*G01S 19/26* (2010.01)

(52) U.S. Cl. .............................. 342/357.43; 342/357.65

(58) Field of Classification Search ............ 342/357.09, 342/357.1, 357.12, 357.13
See application file for complete search history.

(56) References Cited

U.S. PATENT DOCUMENTS 7,167,711 B1 * 1/2007 Dennis .................... 455/456.1

2004/0029583 A1 * 2/2004 Yamamoto et al. .......... 455/427
2008/0188243 A1 * 8/2008 Giustina et al. .......... 455/456.6

FOREIGN PATENT DOCUMENTS

JP       2006-071460 A       3/2006

* cited by examiner

*Primary Examiner*—Thomas H Tarcza
*Assistant Examiner*—Fred H Mull
(74) *Attorney, Agent, or Firm*—Global IP Counselors, LLP

(57) ABSTRACT

A final located position when a GPS receiver section (positioning section) has finished positioning is determined to be the latest located position, and the combination of identification information (ID) of base stations (suspended base stations) with which a portable telephone wireless communication circuit section has performed wireless communication is stored in a flash ROM. The combination of base stations that currently perform wireless communication with the wireless communication section and the combination of the suspended base stations stored in the flash ROM are compared when the GPS receiver section again performs positioning. When it has been determined that the combinations coincide, the latest located position stored in the flash ROM is estimated to be the present position of a portable telephone. The estimated present position is used as the initial position during the first positioning when the GPS receiver section again performs positioning.

14 Claims, 13 Drawing Sheets

FIG. 4
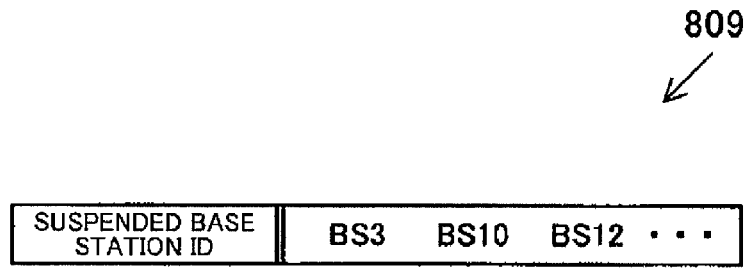
FIG. 5
| POSITIONING MODE | LOCATED POSITION |
|---|---|
| 3D | (X1,Y1,Z1) |
| 3D | (X2,Y2,Z2) |
| 2D WITH ALTITUDE | (X3,Y3,Zh) |
| 2D WITH ALTITUDE | (X4,Y4,Zh) |
| 2D WITHOUT ALTITUDE | (X5,Y5,Z0) |
| ⋮ | ⋮ |
9011 / 9013 / 901
FIG. 6
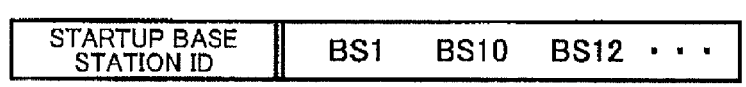

| POSITIONING MODE | LOCATED POSITION | POSITIONING ERROR |
|---|---|---|
| 3D | (X1,Y1,Z1) | E1 |
| 3D | (X2,Y2,Z2) | E2 |
| 2D WITH ALTITUDE | (X3,Y3,Zh) | E3 |
| 2D WITH ALTITUDE | (X4,Y4,Zh) | E4 |
| 2D WITHOUT ALTITUDE | (X5,Y5,Z0) | E5 |
| ... | ... | ... |

9211 — POSITIONING MODE
9213 — LOCATED POSITION
9215 — POSITIONING ERROR

| STARTUP BASE STATION ID | SIGNAL STRENGTH |
|---|---|
| BS1 | P1 |
| BS5 | P5 |
| BS10 | P10 |
| ... | ... |

9231 — STARTUP BASE STATION ID
9233 — SIGNAL STRENGTH

× LATEST LOCATED POSITION
○ ACTUAL POSITION
● CORRECTED POSITION

× LATEST LOCATED POSITION
○ ACTUAL POSITION
● CORRECTED POSITION

PRESENT POSITION ESTIMATION METHOD, POSITIONING METHOD, PROGRAM, AND MOBILE TERMINAL

Japanese Patent Application No. 2007-35375 filed on Feb. 15, 2007 and Japanese Patent Application No. 2007-338825 filed on Dec. 28, 2007, are hereby incorporated by reference in their entirety.

BACKGROUND OF THE INVENTION

The present invention relates to a present position estimation method, a positioning method, a program, and a mobile terminal.

The global positioning system (GPS) is widely known as a positioning system utilizing a satellite, and is used for a mobile terminal such as a portable telephone. A GPS terminal locates its present position by calculating four parameters (i.e., three-dimensional coordinate value which indicates the position of the terminal and a clock error) based on information such as the positions of a plurality of GPS satellites and the pseudo-range between each GPS satellite and the terminal (i.e., positioning calculations).

In positioning calculations, convergent calculations based on the Newton's method or the like are performed on simultaneous equations relating to the pseudo-ranges of a plurality of GPS satellites to calculate a solution (located position). In this case, if the initial position is not set appropriately, the solution may converge incorrectly. Various technologies have been proposed for estimating the present position of a mobile terminal used as the initial position (e.g., JP-A-2006-71460).

These related-art technologies have been developed on the assumption that the mobile terminal moves in a period between the preceding positioning and the present positioning. In the technology disclosed in JP-A-2006-71460, the moving distance of the mobile terminal in a period between the preceding positioning and the present positioning is estimated by multiplying the elapsed time from the preceding positioning to the present positioning by the moving velocity (e.g., 100 km/h) of the mobile terminal set in advance, and the present position of the mobile terminal is determined based on the estimated moving distance and position information relating nearby base station and used as the initial position.

When the mobile terminal has not moved in a period between the preceding positioning and the present positioning, the actual moving distance of the mobile terminal is zero. However, since a large value is calculated as the estimated moving distance as the stop time becomes longer, the present position is not estimated correctly, whereby a position significantly differing from the actual position of the mobile terminal may be set as the initial position.

For example, in the case of an electronic instrument which has a positioning function and of which execution/suspension of positioning is controlled in synchronization with power ON/OFF, the position where the electronic instrument has been turned OFF may be the same as the position where the electronic instrument is turned ON when subsequently used. In this case, since a considerable period of time has expired from the positioning time immediately before the electronic instrument is turned OFF to the time when the electronic instrument is again turned ON, it is difficult to appropriately estimate the present position by applying the technology disclosed in JP-A-2006-71460.

SUMMARY

According to one aspect of the invention, there is provided a present position estimation method that estimates a present position of a mobile terminal, the mobile terminal including a positioning section that receives a satellite signal from a positioning satellite and locates the present position, and a wireless communication section that performs wireless communication with base stations installed in various locations while performing a hand-over process, the method comprising:

storing a final located position that has been located by the positioning section and a communication state when the positioning section finishes positioning, the communication state including at least identification information relating to the base stations that have performed the wireless communication with the wireless communication section;

comparing a present wireless communication state of the wireless communication section with the stored communication state when the positioning section again starts positioning; and estimating the stored located position to be the present position of the mobile terminal when it has been determined that the present wireless communication state of the wireless communication section coincides with the stored communication state.

BRIEF DESCRIPTION OF THE SEVERAL VIEWS OF THE DRAWING

FIG. 4 is a view showing a data configuration example of suspended base station data.

FIG. 5 is a view showing a data configuration example of positioning data.

FIG. 6 is a view showing a data configuration example of startup base station data.

FIG. 11 is a view showing a data configuration example of the of second positioning data.

FIG. 12 is a view showing a data configuration example of the of second startup base station data.

DETAILED DESCRIPTION OF THE EMBODIMENT

Figure 1:
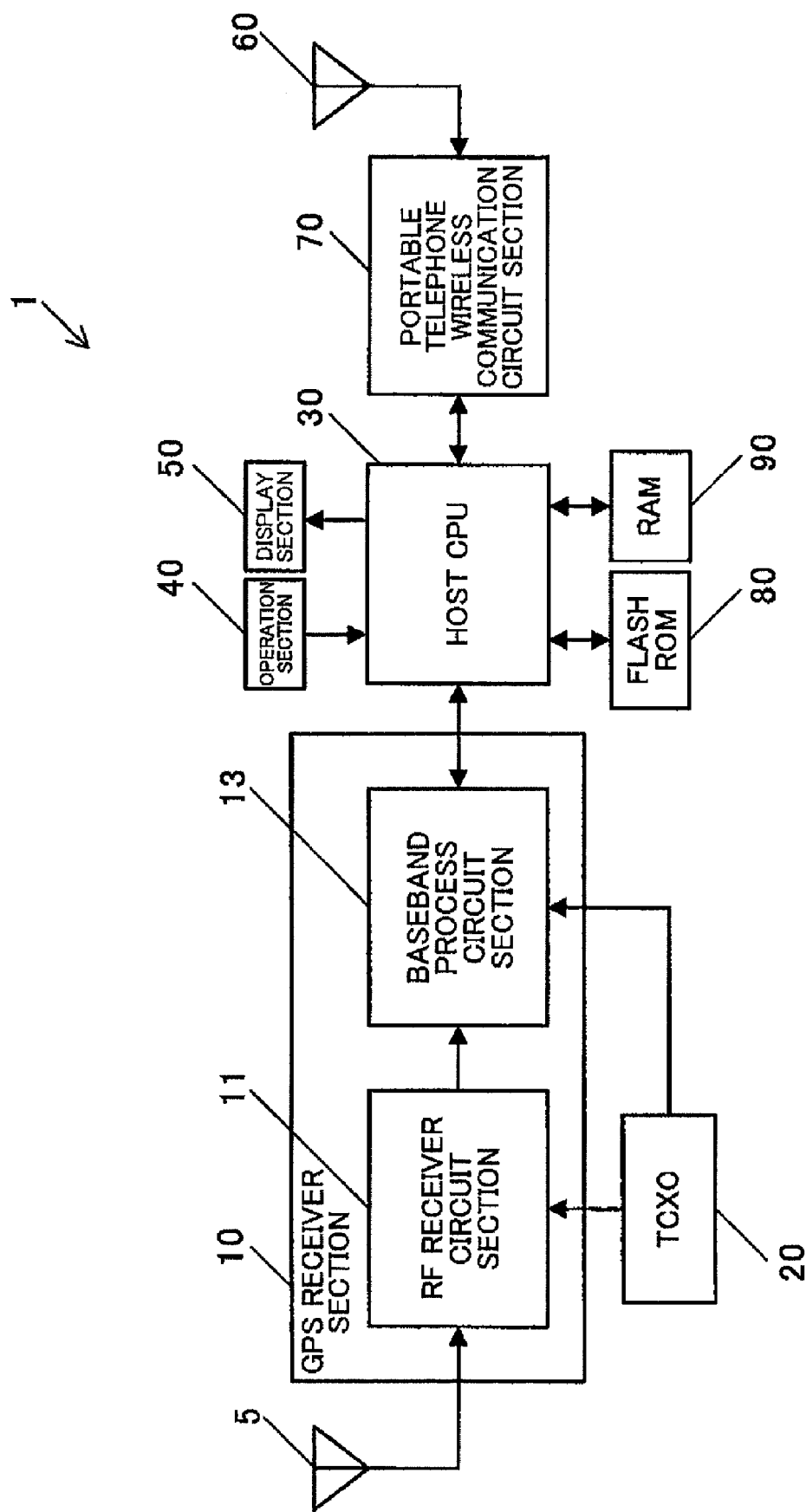
FIG. 1 is a block diagram showing the configuration of a portable telephone.

According to one embodiment of the invention, there is provided a present position estimation method that estimates a present position of a mobile terminal, the mobile terminal including a positioning section that receives a satellite signal from a positioning satellite and locates the present position, and a wireless communication section that performs wireless communication with base stations installed in various locations while performing a hand-over process, the method comprising:

storing a final located position that has been located by the positioning section and a communication state when the positioning section finishes positioning, the communication state including at least identification information relating to the base stations that have performed the wireless communication with the wireless communication section;

comparing a present wireless communication state of the wireless communication section with the stored communication state when the positioning section again starts positioning; and estimating the stored located position to be the present position of the mobile terminal when it has been determined that the present wireless communication state of the wireless communication section coincides with the stored communication state.

According to another embodiment of the invention, there is provided a mobile terminal comprising:

a positioning section that receives a satellite signal from a positioning satellite and locates a present position;

a wireless communication section that performs wireless communication with base stations installed in various locations while performing a hand-over process;

a storage control section that stores a final located position that has been located by the positioning section and a communication state when the positioning section finishes positioning, the communication state including at least identification information relating to the base stations that have performed the wireless communication with the wireless communication section;

a comparison section that compares a present wireless communication state of the wireless communication section with the communication state stored in the storage control section when the positioning section again starts positioning; and a present position estimation section that estimates the located position stored in the storage control section to be the present position of the mobile terminal when the comparison section has determined that the present wireless communication state of the wireless communication section coincides with the communication state stored in the storage control section.

According to this configuration, the final located position that has been located by the positioning section and the communication state that includes at least the identification information relating to the base stations that have performed wireless communication with the wireless communication section are stored when the positioning section finishes positioning. The communication state of the present wireless communication performed by the wireless communication section is compared with the communication state that has been stored when the positioning section again starts positioning, and the located position that has been stored is estimated to be the present position of the mobile terminal when it has been determined that the communication state of the present wireless communication performed by the wireless communication section coincides with the communication state that has been stored.

If the mobile terminal has moved after the preceding positioning, the communication state of the present wireless communication between the mobile terminal and the base station should differ from the communication state during the preceding positioning. In other words, when the communication states coincide, the mobile terminal has been at a standstill or has moved to only a small extent. Therefore, the latest located position is estimated to be the present position of the mobile terminal when the communication states coincide. As a result, the present position can be correctly estimated even if the mobile terminal has been at a standstill.

In the present position estimation method, the storing may include storing the communication state that includes a combination of base stations that have performed wireless communication with the wireless communication section when the positioning section finishes positioning; and the comparing may include comparing a combination of base stations that currently perform wireless communication with the wireless communication section with the stored combination of the base stations.

In the mobile terminal, the storage control section may store the communication state that includes a combination of base stations that have performed wireless communication with the wireless communication section when the positioning section finishes positioning; and the comparison section may compare a combination of base stations that currently perform wireless communication with the wireless communication section with the combination of the base stations stored in the storage control section.

According to this configuration, the combination of the base stations that have performed wireless communication with the wireless communication section when the positioning section finishes positioning is stored. The combination of the base stations that currently perform wireless communication with the wireless communication section is compared with the stored combination of the base stations. If the mobile terminal has been at a standstill, the combination of the base stations that have performed wireless communication with the wireless communication section when the positioning section finishes positioning should coincide with the combination of the base stations that currently perform wireless communication with the wireless communication section. Therefore, whether or not the mobile terminal has been at a standstill can be simply determined by comparing the combinations of the base stations.

In the present position estimation method, the comparing may include determining whether or not an identical femto cell base station is included in the base stations that currently perform wireless communication with the wireless communication section and the base stations that have been stored, or whether or not the base station that currently performs wireless communication with the wireless communication section and the base station that has been stored are an identical femto cell base station; and when it has been determined that an identical femto cell base station is included in the base stations that currently perform wireless communication with the wireless communication section and the base stations that have been stored, or the base station that currently performs wireless communication with the wireless communication section and the base station that has been stored are an identical femto cell base station, the estimating of the present position may include reading position information relating to the identical femto cell base station from a storage section that stores position information relating to a base station that can perform wireless communication with the wireless communication section, and estimating a position indicated by the read position information to be the present position of the mobile terminal.

In the mobile terminal, the comparison section may include a femto cell base station determination section that determines whether or not an identical femto cell base station is included in the base stations that currently perform wireless communication with the wireless communication section and the base stations that are stored in the storage control section, or whether or not the base station that currently performs wireless communication with the wireless communication section and the base station stored in the storage control section are an identical femto cell base station; and when the cell base station determination section has been determined that an identical femto cell base station is included in the base stations that currently perform wireless communication with the wireless communication section and the base stations that have been stored, or the base station that currently performs wireless communication with the wireless communication section and the base station stored in the storage control section are an identical femto cell base station, the present position estimation section may read position information relating to the identical femto cell base station from a storage section that stores position information relating to base stations that can perform wireless communication with the wireless communication section, and may estimate a position indicated by the read position information to be the present position of the mobile terminal.

According to this configuration, when an identical femto cell base station is included in the base stations that currently perform wireless communication with the wireless communication section and the base stations that have been stored, or when each base station is an identical femto cell base station, the position of the identical femto cell base station is estimated to be the present position of the mobile terminal. Since the communication area (cover area) of the femto cell base station is small, the position of the femto cell base station can be estimated to be the present position of the mobile terminal.

In the present position estimation method, when the mobile terminal can communicate with the identical femto cell base station or another femto cell base station after estimating a position of the identical femto cell base station to be the present position of the mobile terminal, the method may further include estimating a position of the femto cell base station the can communicate with the mobile terminal to be the present position of the mobile terminal as long as the mobile terminal can communicate with the femto cell base station.

According to this configuration, when it is possible to communicate with the femto cell base station, the position of the femto cell base station can be estimated to be the present position of the mobile terminal.

In the present position estimation method, the storing may include storing the communication state that includes a combination of base stations that have performed wireless communication with the wireless communication section and a radio wave state between the mobile terminal and each of the base stations when the positioning section finishes positioning; and the comparing may include comparing a combination of base stations that currently perform wireless communication with the wireless communication section and a radio wave state between the mobile terminal and each of the base stations with the combination of the base stations and the radio wave state that have been stored.

In the mobile terminal, the storage control section may store the communication state that includes a combination of base stations that have performed wireless communication with the wireless communication section and a radio wave state between the mobile terminal and each of the base stations when the positioning section finishes positioning; and the comparison section may compare a combination of base stations that currently perform wireless communication with the wireless communication section and a radio wave state between the mobile terminal and each of the base stations with the combination of the base stations and the radio wave state that are stored in the storage control section.

According to this configuration, the combination of the base stations that have performed wireless communication with the wireless communication section and the radio wave state between the mobile terminal and each base station when the positioning section finishes positioning are stored. The combination of the base stations that currently perform wireless communication with the wireless communication section and the radio wave state between the mobile terminal and each of the base stations are compared with the combination and a radio wave state of the base stations that are stored in the storage control section. Whether or not the mobile terminal has been at a standstill can be more reliably determined by comparing the radio wave states in addition to the combinations of the base stations.

In the present position estimation method, the comparing may include determining that the present wireless communication state of the wireless communication section is the same as the stored communication state when the combination of the base stations that currently perform wireless communication with the wireless communication section is the same as the stored combination of the base stations and a difference in the radio wave state satisfies a given approximation condition; and the estimating of the present position may include correcting the stored located position and estimating the present position based on the stored radio wave state between the mobile terminal and each of the base stations and the present radio wave state when it has been determined that the combination of the base stations that currently perform wireless communication with the wireless communication section is the same as the stored combination of the base stations and the difference in the radio wave state does not satisfy the given approximation condition.

In the mobile terminal, the comparison section may determine that the present wireless communication state of the wireless communication section is the same as the communication state stored in the storage control section when the combination of the base stations that currently perform wireless communication with the wireless communication section is the same as the combination of the base stations stored in the storage control section and a difference in the radio wave state satisfies a given approximation condition; and the present position estimation section may include a first correction-estimation section that corrects the located position stored in the storage control section to estimate the present position based on the radio wave state between the mobile terminal and each of the base stations stored in the storage control section and a present radio wave state when the comparison section has been determined that the combination of the base stations that currently perform wireless communication with the wireless communication section is the same as the combination of the base stations stored in the storage control section and the difference in the radio wave state does not satisfy the given approximation condition.

According to this configuration, the communication state of the present wireless communication performed by the wireless communication section is determined to be the same as the communication state that has been stored when the combination of the base stations that currently perform wireless communication with the wireless communication section is the same as the combination of the base stations that have been stored and a difference in the radio wave state satisfies a given approximation condition. When it has been determined that the combinations of the base stations are identical but the difference in radio wave state do not satisfy the given approximation condition, the stored located position is corrected based on the radio wave state with the stored base station and the present radio wave state.

When the combination of the base stations during the preceding positioning coincides with the combination of the present communication target base stations and the radio wave states coincide, it is considered that the mobile terminal has not moved after the preceding positioning. However, even if the combinations of the base stations coincide, it is likely that the mobile terminal has moved after the preceding positioning when the radio wave states differ. In this case, the present position can be appropriately estimated taking the movement of the mobile terminal into consideration by correcting the final located position.

In the present position estimation method, the estimating of the present position may include reading position information relating to a base station that is a base station that currently performs wireless communication with the wireless communication section and excludes the stored base stations from a storage section that stores position information relating to base stations that can perform wireless communication with the wireless communication section when it has been determined that the combinations of the base stations are partially identical, and correcting the stored located position using the read position information to estimate the present position.

In the mobile terminal, the storage control section may include a position information storage control section that stores position information relating to base stations that can perform wireless communication with the wireless communication section; and the present position estimation section may include a second correction-estimation section that reads and acquires position information relating to a base station that is a base station that currently performs wireless communication with the wireless communication section and excludes the base stations stored in the storage control section from the position information storage control section when the comparison section has determined that the combinations of the base stations are partially identical, and corrects the located position stored in the storage control section using the acquired position information to estimate the present position.

According to this configuration, when it has been determined that the combinations of base stations partially coincide, the position information relating to a base station that is the base station that currently performs wireless communication with the wireless communication section and is not the base stations that have been stored are read and acquired. The stored located position is corrected using the acquired position information, and the present position is estimated.

When the combinations of the base stations do not coincide, it is considered that the mobile terminal has moved to a large extent after the preceding positioning. On the other hand, when the combinations of the base stations partially coincide, it is considered that the mobile terminal is located at a position relatively close to the position during the preceding positioning. In this case, the initial position can be estimated by correcting the latest located position based on the position information of the base station which is not the stored base station.

In the present position estimation method, the positioning section may locate a position while changing calculation accuracy corresponding to a reception state of the satellite signal;

the storing may include further storing the calculation accuracy of the positioning section when the positioning section finishes positioning;

the method may further include determining whether or not the stored calculation accuracy satisfies a given accuracy condition when the positioning section again starts positioning; and the estimating of the present position may include estimating the present position when it has been determined that the stored calculation accuracy does not satisfy the given accuracy condition without estimating the present position when it has been determined that the stored calculation accuracy satisfies the given accuracy condition.

In the mobile terminal, the positioning section may locate a position while changing calculation accuracy corresponding to a reception state of the satellite signal;

the storage control section may further store the calculation accuracy of the positioning section when the positioning section finishes positioning;

the mobile terminal may further include a positioning accuracy determination section that determines whether or not the calculation accuracy stored in the storage control section satisfies a given accuracy condition; and the present position estimation section may estimate the present position when the positioning accuracy determination section has determined that the calculation accuracy does not satisfy the given accuracy condition without estimating the present position when the positioning accuracy determination section has determined that the calculation accuracy satisfies the given accuracy condition.

According to this configuration, the positioning section locates the position while changing the calculation accuracy corresponding to the reception state of the satellite signal, and the calculation accuracy when finishing positioning is further stored. Whether or not the calculation accuracy that has been stored satisfies a given accuracy condition is determined when the positioning section again start positioning. The present position is not estimated when it has been determined that the calculation accuracy that has been stored does not satisfy the given accuracy condition, and the present position is estimated when it has been determined that the calculation accuracy that has been stored satisfies the given accuracy condition. A situation in which a located position with low reliability is estimated to be the present position of the mobile terminal can be prevented by determining whether or not to estimate the present position based on the calculation accuracy during the preceding positioning.

According to another embodiment of the invention, there is provided a positioning method that is performed by a positioning section of a mobile terminal that includes the positioning section that receives a satellite signal from a positioning satellite and locates a present position, and a wireless communication section that performs wireless communication with base stations installed in various locations while performing a hand-over process, the method comprising:

locating a position based on the received satellite signal using the present position estimated by one of the above present position estimation methods as an initial position.

According to this configuration, a position is located based on the received satellite signal using the estimated present position as the initial position.

According to another embodiment of the invention, there is provided a program causing a computer to execute one of the above present position estimation methods, the computer being a mobile terminal that includes a positioning section that receives a satellite signal from a positioning satellite and locates a present position, and a wireless communication section that performs wireless communication with base stations installed in various locations while performing a hand-over process.

Preferred embodiments of the invention are described in detail below with reference to the drawings.

The following embodiments illustrate specific preferred examples of the invention, and are provided with various technologically preferred limitations. Note that the scope of the invention is not limited to the following embodiments unless there is a description which limits the invention.

An embodiment in which the invention is applied to a portable telephone (i.e., one type of mobile terminal) is described below with reference to the drawings.

1. First Embodiment 1-1. Configuration

FIG. 1 is a block diagram showing the functional configuration of a portable telephone 1 according to this embodiment. The portable telephone 1 includes a GPS antenna 5, a GPS receiver section 10, a temperature-compensated crystal oscillator (TCXO) 20, a host CPU 30, an operation section 40, a display section 50, a portable telephone antenna 60, a portable telephone wireless communication circuit section 70, a flash read only memory (ROM) 80, and a random access memory (RAM) 90.

The GPS antenna 5 is an antenna which receives an RF signal containing a GPS satellite signal transmitted from a GPS satellite (i.e., positioning satellite). The GPS antenna 5 outputs the received signal to the GPS receiver section 10. The GPS satellite signal is a spread spectrum modulated signal called a coarse and acquisition (C/A) code. The GPS satellite signal is superimposed on a carrier in an L1 band (carrier frequency: 1.57542 GHz).

The GPS receiver section 10 is a positioning section which locates the present position of the portable telephone 1 based on a signal output from the GPS antenna 5. The GPS receiver section 10 is a functional block corresponding to a GPS receiver. The GPS receiver section 10 includes a radio frequency (RF) receiver circuit section 11 and a baseband process circuit section 13. The RF receiver circuit section 11 and the baseband process circuit section 13 may be produced as different large scale integrated (LSI) circuits, or may be produced in one chip.

The RF receiver circuit section 11 is a high-frequency signal (RF signal) circuit block. The RF receiver circuit section 11 generates an RF signal multiplication oscillation signal by dividing or multiplying the frequency of the oscillation signal generated by the TCXO 20. The RF receiver circuit section 11 down-converts the RF signal into an intermediate-frequency signal (hereinafter referred to as "IF signal") by multiplying the oscillation signal by the RF signal output from GPS antenna 5. The RF receiver circuit section 11 amplifies the IF signal, converts the amplified signal using an A/D converter, and outputs the resulting signal to the baseband process circuit section 13.

The baseband process circuit section 13 is a circuit section which acquires/extracts the GPS satellite signal by performing a correlation process and the like on the IF signal output from the RF receiver circuit section 11, decodes data contained in the GPS satellite signal to acquire a navigation message, time information, and the like, and performs pseudo-range calculations, positioning calculations, and the like. The baseband process circuit section 13 includes a circuit which performs the correlation process, a circuit which generates a spread code (code replica) for the correlation process, a circuit which decodes data, a CPU (i.e., processor), a ROM, and a RAM (memories).

The TCXO 20 is a temperature-compensated crystal oscillator which generates an oscillation signal having a given oscillation frequency. The TCXO 50 outputs the generated oscillation signal to the RF receiver circuit section 11 and the baseband process circuit section 13. Note that the TCXO 20 may be integrated with the GPS receiver section 10 instead of separately providing the TCXO 20 from the GPS receiver section 10.

The host CPU 30 is a processor which controls each section of the portable telephone 1 based on various programs such as a system program stored in the flash ROM 80. The host CPU 30 controls the GPS receiver section 10 based on a control program stored in the flash ROM 80.

The operation section 40 is an input device including a touch panel, a button switch, or the like, and outputs a signal which indicates a key or a button which has been pressed to the host CPU 30. A telephone call, e-mail transmission/reception, power supply ON/OFF, or the like is directed by the operation of the operation section 40.

The display section 50 is a display device which includes a liquid crystal display (LCD) or the like, and displays various images based on a display signal input from the host CPU 30. The display section 50 displays time information, a navigation screen, or the like.

The portable telephone antenna 60 is an antenna which transmits or receives a portable telephone radio signal to or from a radio base station (hereinafter referred to as "base station") installed by a communication service provider of the portable telephone 1.

The portable telephone wireless communication circuit section 70 is a portable telephone communication circuit section which includes an RF conversion circuit, a baseband process circuit, and the like. The portable telephone wireless communication circuit section 70 implements a telephone call, e-mail transmission/reception, or the like by modulating/demodulating the portable telephone radio signal, for example.

The portable telephone wireless communication circuit section 70 constantly receives/detects portable telephone communication performed between the portable telephone 1 and each base station (hereinafter referred to as "base station communication"; signal relating to the base station communication is hereinafter referred to as "base station communication signal") through the portable telephone antenna 60. The portable telephone wireless communication circuit section 70 performs a hand-over process which performs base station communication with a plurality of base stations and switches the communication target base station based on a change in signal strength between the portable telephone 1 and the base station due to the movement of the portable telephone 1.

The flash ROM 80 is a rewritable nonvolatile memory. The flash ROM 80 stores a system program which controls the portable telephone 1, a program and data which implement a navigation function, and the like. The data stored in the flash ROM 80 is not lost even if the portable telephone 1 is disconnected from the power supply.

The RAM 90 is a readable/writable memory. The RAM 90 serves as a work area which temporarily stores a system program executed by the host CPU 30, a processing program, processed data, process results, and the like.

Figure 2A:
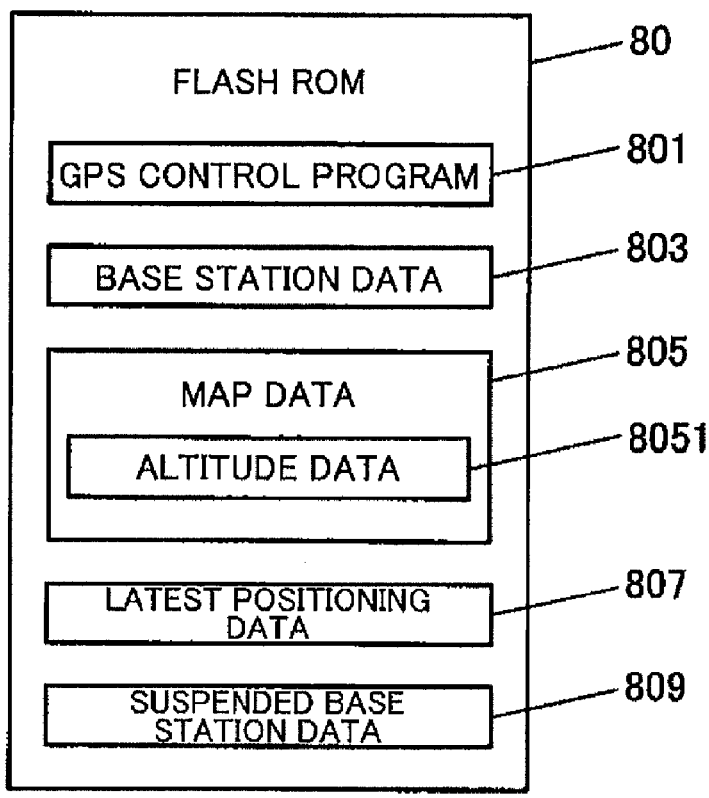
FIG. 2A is a view showing the configuration of a flash ROM.
Figure 2B:
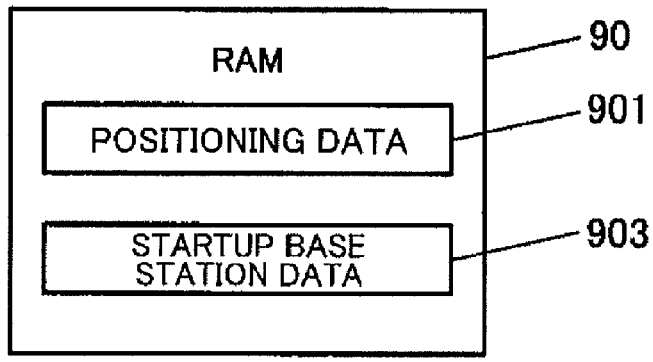
FIG. 2B is a view showing the configuration of a RAM.

FIGS. 2A and 2B are views showing examples of data stored in the flash ROM 80 and the RAM 90. The flash ROM 80 stores a GPS control program 801 which is read by the host CPU 30 and executed as a GPS control process (see FIG. 7), base station data 803, map data 805, latest positioning data 807, and suspended base station data 809.

The GPS control process is a process in which the host CPU 30 compares a combination of base stations positioned within the present communication area with a combination of base stations positioned within the communication area when the operation of the GPS receiver section 10 has been previously suspended, and estimates the present position of the portable telephone 1 based on the comparison result. The host CPU 30 causes the GPS receiver section 10 to perform the first positioning calculations after startup using the estimated present position as the initial position. When the host CPU 30 has detected a positioning finish instruction, the host CPU 30 suspends the operation of the GPS receiver section 10. The details of the GPS control process are described later using a flowchart.

The base station data 803 contains base station information including identification information (ID), location information, and the like relating to each base station of the portable telephone 1.

The map data 805 contains map information including road information and building information. The map data 805 includes altitude data 8051 which specifies altitude of each location. Note that the altitude data 8051 does not necessarily specify the altitudes of all places of the earth.

Figure 3:
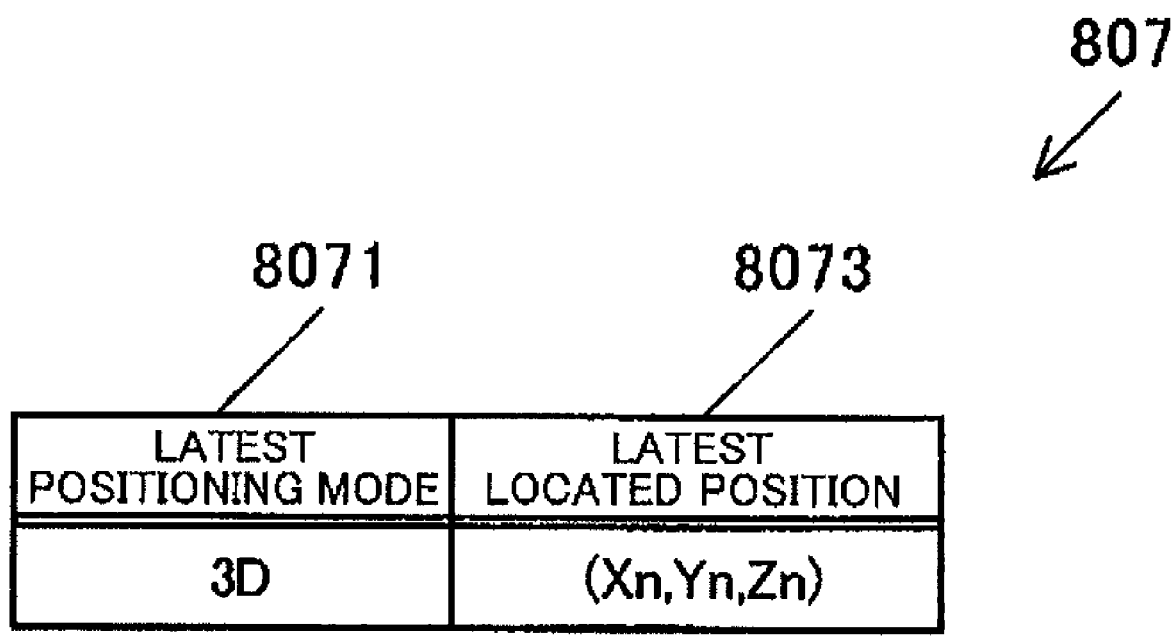
FIG. 3 is a view showing a data configuration example of latest positioning data.

FIG. 3 is a view showing an example of the data configuration of the latest positioning data 807. As the latest positioning data 807, a latest positioning mode 8071 and a latest located position 8073 are stored as the latest positioning results when the GPS positioning operation has been suspended while being associated with each other. In the GPS control process, when the host CPU 30 has detected a positioning finish instruction, the host CPU 30 stores the positioning results for the latest record stored in the RAM 90 (positioning data 901) as the latest positioning data 807 (latest positioning results).

FIG. 4 is a view showing an example of the data configuration of the suspended base station data 809. As the suspended base station data 809, the ID of a base station positioned within the communication area when the GPS positioning operation has been suspended (hereinafter referred to as "suspended base station") is stored as the communication state when the GPS positioning operation has been suspended. In the GPS control process, the host CPU 30 determines the communication target base station when the operation of the GPS receiver section 10 is suspended to be the suspended base station, and stores the ID of the suspended base station as the suspended base station data 809.

The positioning data 901 and startup base station data 903 are stored in the RAM 90.

FIG. 5 is a view showing an example of the data configuration of the positioning data 901. As the positioning data 901, a positioning mode 9011 and a located position 9013 are stored as the positioning results in time series while being associated with each other. The positioning mode 9011 indicates the type (mode) of positioning calculations which have been performed by the GPS receiver section 10. "3D", "2D with altitude", or "2D without altitude" is stored as the positioning mode 9011. The accuracy of positioning calculations (hereinafter referred to as "calculation accuracy") is determined by the positioning mode 9011.

The positioning mode "3D" is a positioning mode when the number of acquired GPS satellites (hereinafter referred to as "acquired satellites") is four or more. In this case, the GPS receiver section 10 performs positioning calculations based on information (e.g., position and pseudo-range) relating to each acquired satellite.

The positioning mode "2D with altitude" is a positioning mode when the number of acquired satellites is three and the present position including the altitude is located utilizing the altitude data 8051. In this case, the GPS receiver section 10 performs positioning calculations utilizing the information (e.g., position and pseudo-range) relating to each acquired satellite and altitude information specified as the altitude data 8051.

The positioning mode "2D without altitude" is a positioning mode when the number of acquired satellites is three and the altitude cannot be specified utilizing the altitude data 8051. In this case, the GPS receiver section 10 performs positioning calculations utilizing the information (e.g., position and pseudo-range) relating to each acquired satellite and estimated altitude information (e.g., "altitude=0 m"). In the positioning mode "2D without altitude", since positioning calculations are performed while estimating the altitude, the calculation accuracy deteriorates as compared with the positioning mode "3D" or "2D with altitude".

The located position 9013 is a position determined by the positioning calculations performed by the GPS receiver section 10. For example, three-dimensional coordinate value in the terrestrial reference frame is stored as the located position 9013. In the GPS control process, the host CPU 30 causes the GPS receiver section 10 to perform positioning calculations based on the initial position which has been set. The host CPU 30 receives the positioning mode 9011 and the located position 9013 from the GPS receiver section 10, and stores the positioning mode 9011 and the located position 9013 as the positioning data 901 (i.e., present positioning results).

FIG. 6 is a view showing an example of the data configuration of the startup base station data 903. As the startup base station data 903, the ID of a base station which is positioned within the communication area when the GPS positioning operation has been started (hereinafter referred to as "startup base station") is stored as the communication state when the GPS positioning operation has been started. In the GPS control process, the host CPU 30 performs base station communication with each base station when the GPS positioning operation has been started, and determines the base station with which base station communication has been established to be the startup base station. The host CPU 30 stores the ID of the startup base station as the startup base station data 903.

1-2. Process Flow

Figure 7:
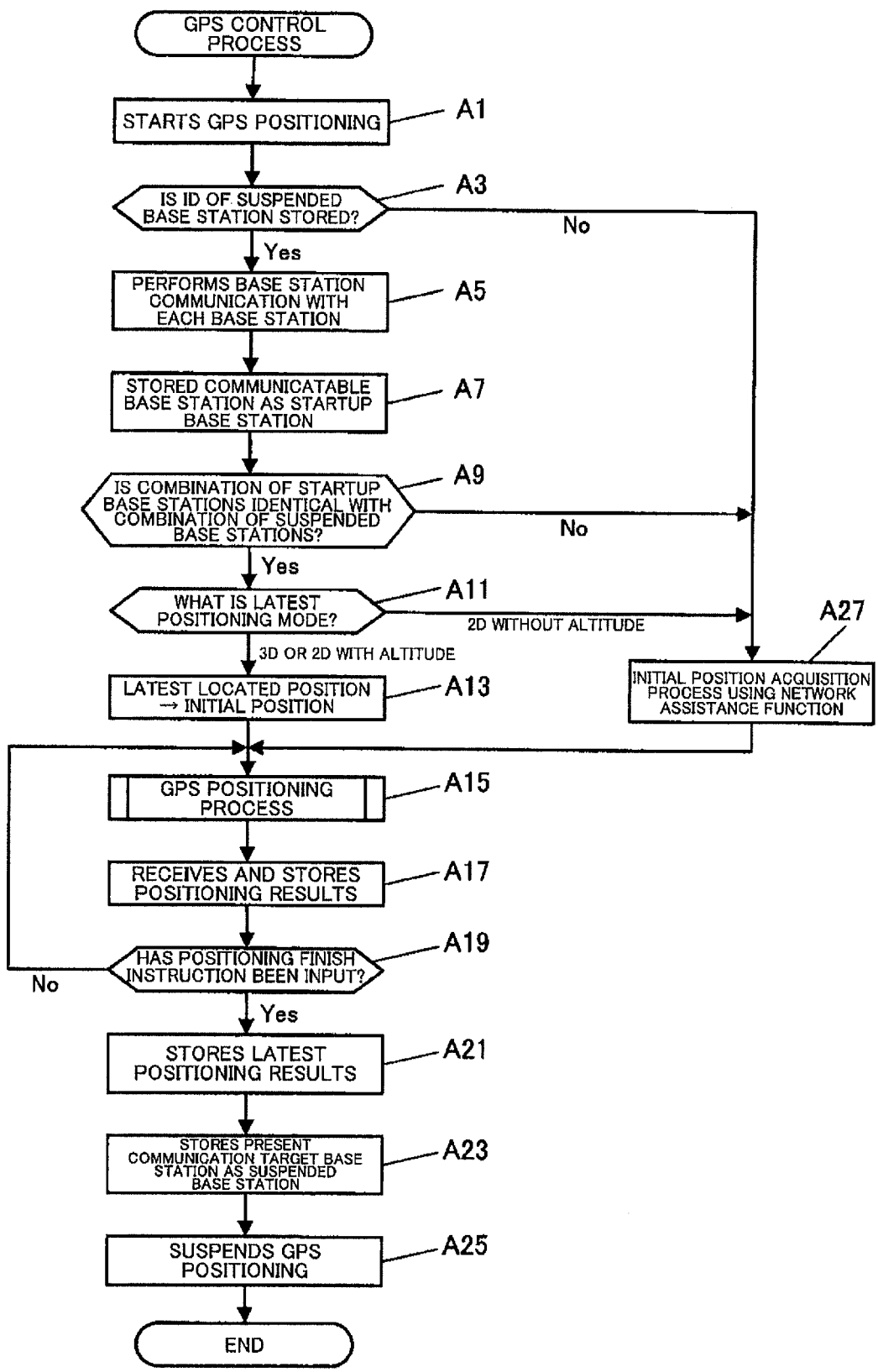
FIG. 7 is a flowchart showing the flow of a GPS control process.

FIG. 7 shows the flow of the GPS control process of the portable telephone 1 which is performed by causing the host CPU 30 to read and execute the GPS control program 801 stored in the flash ROM 80. The GPS control process is performed by the host CPU 30 when the host CPU 30 has detected a positioning start instruction from the operation section 40. The GPS control process is performed in parallel with the main process such as a telephone call or e-mail transmission/reception. An ON/OFF operation for the portable telephone 1 may be associated with GPS startup/suspension, and the GPS control process may be performed when detecting an ON operation for the portable telephone 1.

The host CPU 30 activates the GPS receiver section 10 (step A1). The host CPU 30 determines whether or not the ID of the suspended base station is stored in the suspended base station data 809 in the flash ROM 80 (step A3). When the host CPU 30 has determined that the ID of the suspended base station is stored as the suspended base station data 809 (step A3: Yes), the host CPU 30 performs base station communication with each base station (step A5).

The host CPU 30 determines the base station with which the host CPU 30 can perform base station communication in the step A5 to be the startup base station, and stores the ID of the startup base station as the startup base station data 903 in the RAM 90 (step A7). The host CPU 30 determines whether or not the combination of the startup base stations stored as the startup base station data 903 is identical with the combination of the suspended base stations stored as the suspended base station data 809 (step A9).

When the host CPU 30 has determined that the combinations of the stations are identical in the step A9 (step A9: Yes), the host CPU 30 determines the latest positioning mode 8071 stored as the latest positioning data 807 in the flash ROM 80 (step A11). When the host CPU 30 has determined that the latest positioning mode 8071 is "3D" or "2D with altitude" (step A11: 3D or 2D with altitude), the host CPU 30 estimates the latest located position 8073 stored as the latest positioning data 807 to be the present position of the portable telephone 1, and sets the estimated present position to be the initial position (step A13).

When the combinations of the startup base stations and the suspended base stations are the same, the portable telephone 1 has been at a standstill or moved to only a small extent after the time when the GPS positioning operation has been suspended. When the latest positioning mode 8071 is "3D" or "2D with altitude", the calculation accuracy during the preceding positioning is high. Therefore, only when these conditions are satisfied, the final located position obtained during the preceding positioning is estimated to be the present position of the portable telephone 1 and is set to be the initial position.

The host CPU 30 performs a GPS positioning process which causes the GPS receiver section 10 to perform positioning calculations based on the initial position which has been set (step A15). The GPS receiver section 10 performs positioning calculations while changing the positioning mode between the three positioning modes "3D", "2D with altitude", and "2D without altitude" depending on the number of acquired satellites and the presence or absence of the height information. This process is known in the art. Therefore, detailed description is omitted.

After the GPS positioning process, the host CPU 30 receives the positioning results from the GPS receiver section 10, and stores the positioning results as the positioning mode 9011 and the located position 9013 of the positioning data 901 in the RAM 90 as new data (step A17). The host CPU 30 determines whether or not the positioning finish instruction has been input using the operation section 40 (step A19). When the host CPU 30 has determined that the positioning finish instruction has not been input (step A19: No), the host CPU 30 returns to the step A15.

When the host CPU 30 has determined that the positioning finish instruction has been input in the step A19 (step A19: Yes), the host CPU 30 stores the positioning results for the latest record stored as the positioning data 901 as the latest positioning data 807 (latest positioning results) to update the latest positioning data 807 (step A21).

The host CPU 30 determines the present communication target base station to be the suspended base station, and stores the ID of the suspended base station as the suspended base station data 809 in the flash ROM 80 (step A23). The host CPU 30 then suspends the operation of the GPS receiver section 10 (step A25), and finishes the GPS control process.

When the host CPU 30 has determined that the ID of the suspended base station is not stored in the step A3 (step A3: No), the host CPU 30 performs an initial position acquisition process using a network assistance function (step A27).

When the host CPU 30 has determined that the combinations of the base stations are not the same in the step A9 (step A9: No), or has determined that the latest positioning mode 8071 is "2D without altitude" in the step A11 (step A11: 2D without altitude), the host CPU 30 transitions to the step A27, and performs the initial position acquisition process using the network assistance function.

When the combinations of the startup base stations and the suspended base stations are not the same, the portable telephone 1 has moved to a large extent after the time when the GPS positioning operation has been suspended. When the latest positioning mode 8071 is "2D without altitude", the calculation accuracy during the preceding positioning is low. Therefore, the final located position obtained during the preceding positioning is not estimated to be the present position of the portable telephone 1, and the position information is acquired using the network assistance function.

In the initial position acquisition process using the network assistance function, the host CPU 30 performs base station communication with each base station, and inquires the present position of the base station with which the host CPU 30 can communicate. The base station accesses a server which manages all base stations and makes inquiries as to the present position.

The server estimates and calculates the present position of the portable telephone 1 based on information relating to the installation locations of a plurality of base stations which accessed the server, and transmits the present position of the portable telephone 1 to the base station which accessed the server, for example. The base station transmits the position received from the server to the portable telephone 1 as information relating to the present position of the portable telephone 1.

The host CPU 30 may calculates the present position without inquiring of the base station about the present position. Specifically, the host CPU 30 refers to the base station data 803 stored in the flash ROM 80, and determines a position calculated by averaging the installation location of each base station with which the host CPU 30 performs base station communication to be the initial position.

After performing the initial position acquisition process in the step A27, the host CPU 30 transitions to the step A15, and causes the GPS receiver section 10 to perform positioning calculations based on the acquired initial position.

1-3. Effects

According to the first embodiment, the final located position when the GPS receiver section 10 (positioning section) finishes positioning is determined to be the latest located position, and the combination of the identification information (ID) of the base stations (suspended base stations) with which the portable telephone wireless communication circuit section 70 has performed wireless communication is stored in a flash ROM 80. When the GPS receiver section 10 again performs positioning, the combination of the startup base stations detected as base stations with which the portable telephone wireless communication circuit section 70 performs wireless communication is compared with the combination of the suspended base stations stored in the flash ROM 80. When it has been determined that the combinations coincide, the latest located position stored in the flash ROM 80 is estimated to be the present position of the portable telephone 1. The estimated present position is used as the initial position during the first positioning when the GPS receiver section 10 again performs positioning.

If the portable telephone 1 has moved to a large extent after the preceding positioning time, the combination of the suspended base stations should differ from the combination of the startup base stations. In other words, when the combinations of the base stations coincide, the portable telephone 1 has been at a standstill or has moved to only a small extent after the time when positioning has been suspended. Therefore, the present position of the portable telephone 1 when the portable telephone 1 is at a standstill can be correctly estimated by estimating the located position when the portable telephone 1 is at a standstill to be the present position of the portable telephone 1 when the combination of the startup base stations coincides with the combination of the suspended base stations.

In the first embodiment, the GPS receiver section 10 locates the position while changing the positioning mode depending on the reception state of the GPS satellite signal (the number of acquired GPS satellites), and the positioning mode when positioning is finished is stored in the flash ROM 80 as the latest positioning mode. When the GPS receiver section 10 again performs positioning, the latest positioning mode stored in the flash ROM 80 is determined. When the latest positioning mode is "2D without altitude", the present position is not estimated since the calculation accuracy is low. The present position is estimated only when the latest positioning mode is "3D" or "2D with altitude".

A situation in which a located position with low reliability is estimated to be the present position of the portable telephone 1 can be prevented by determining whether or not to estimate the present position based on the calculation accuracy during the preceding positioning. Therefore, a situation in which positioning calculations are performed based on an inappropriate initial position can be prevented.

2. Second Embodiment

2-1. Configuration

Figure 8A:
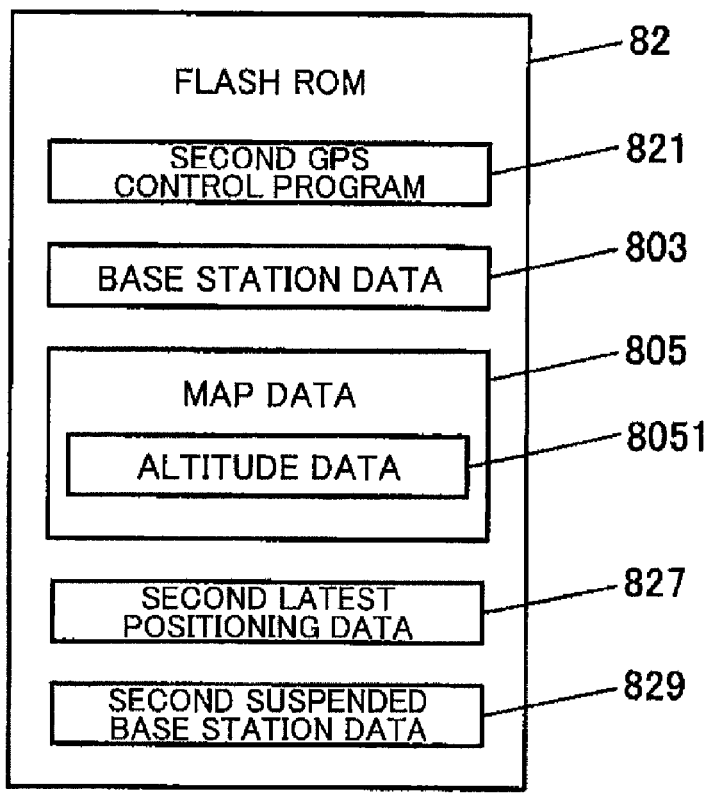
FIG. 8A is a view showing the configuration of a flash ROM.
Figure 8B:
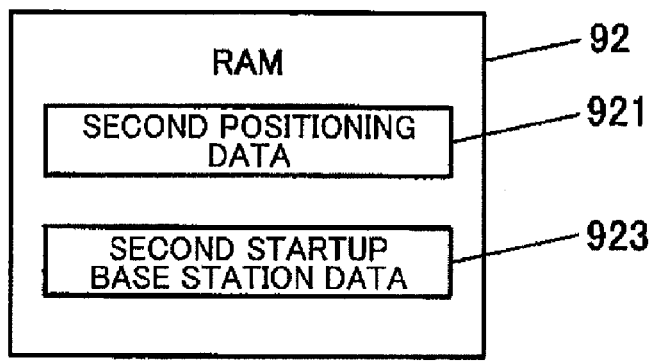
FIG. 8B is a view showing the configuration of a RAM.

FIG. 8A is a view showing an example of data stored in a flash ROM 82 according to a second embodiment. FIG. 8B is a view showing an example of data stored in a RAM 92. The same elements as the elements according to the first embodiment are indicated by the same symbols. Description of these elements is omitted.

The flash ROM 82 stores a second GPS control program 821 which is read by the host CPU 30 and executed as a second GPS control process (see FIGS. 13 and 14), base station data 803, the map data 805, second latest positioning data 827, and second suspended base station data 829.

The second GPS control process is a process in which the host CPU 30 estimates the present position of the portable telephone 1 based on the combination of the startup base stations, the combination of the suspended base stations, and the radio wave state (communication state) between the portable telephone 1 and each startup base station and each suspended base station. The host CPU 30 causes the GPS receiver section 10 to perform positioning calculations using the estimated present position as the initial position. When the host CPU 30 has detected a positioning finish instruction, the host CPU 30 suspends the operation of the GPS receiver section 10. The second GPS control process is described later in detail using a flowchart.

Figure 9:
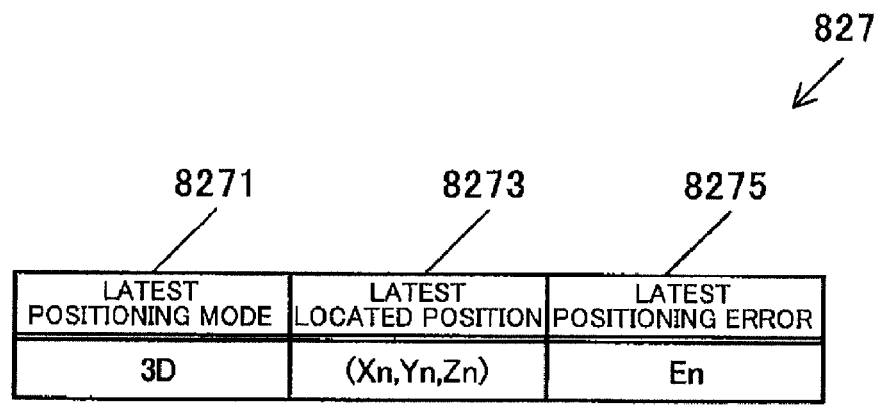
FIG. 9 is a view showing a data configuration example of second latest positioning data.

FIG. 9 is a view showing an example of the data configuration of the second latest positioning data 827. As the second latest positioning data 827, a latest positioning mode 8271, a latest located position 8273, and a latest positioning error 8275 are stored as the latest positioning results while being associated with one another. In the second GPS control process, when the host CPU 30 has detected a positioning finish instruction, the host CPU 30 stores the positioning results for the latest record stored in the RAM 92 (second positioning data 921) as the second latest positioning data 827 (latest positioning results).

Figure 10:
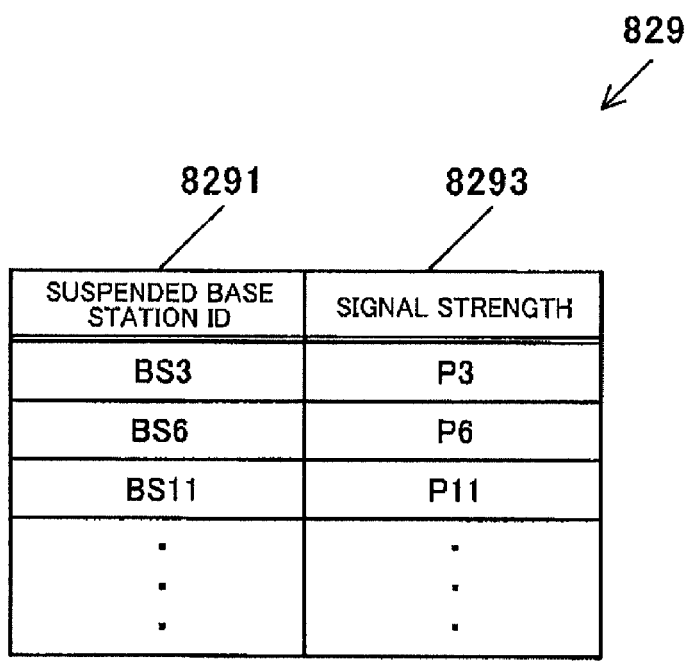
FIG. 10 is a view showing a data configuration example of second suspension base station data.

FIG. 10 is a view showing an example of the data configuration of the second suspended base station data 829. As the second suspended base station data 829, a suspended base station ID 8291 and a signal strength 8293 of a base station communication signal received from the suspended base station during communication with the suspended base station are stored while being associated with each other as the communication state when the GPS positioning operation has been suspended.

Second positioning data 921 and second startup base station data 923 are stored in the RAM 92.

FIG. 11 is a view showing an example of the data configuration of the second positioning data 921. As the second positioning data 921, a positioning mode 9211, a located position 9213, and a positioning error 9215 are stored as the positioning results while being associated with one another. The data stored as the positioning mode 9211 and the located position 9213 is respectively the same as the data stored as the positioning mode 9011 and the located position 9013 of the positioning data 901 shown in FIG. 5.

The positioning error 9215 is the maximum value of a position error included in the located position 9213 determined by positioning calculations. For example, "5 m" is stored as the positioning error 9215. The GPS receiver section 10 calculates a range of a position error which may be included in the located position (hereinafter referred to as "position error range") while performing positioning calculations, and outputs the position error range to the host CPU 30. The host CPU 30 stores the maximum value of the position error range input from the GPS receiver section 10 as the positioning error 9215 of the second positioning data 921. A position error calculation method is known in the art. Therefore, detailed description is omitted.

FIG. 12 is a view showing an example of the data configuration of the second startup base station data 923. As the second startup base station data 923, a startup base station ID 9231 and a signal strength 9233 of the base station communication signal received from the startup base station during communication with the startup base station are stored while being associated with each other as the communication state when the GPS positioning operation is started.

2-2. Process Flow

Figure 13:
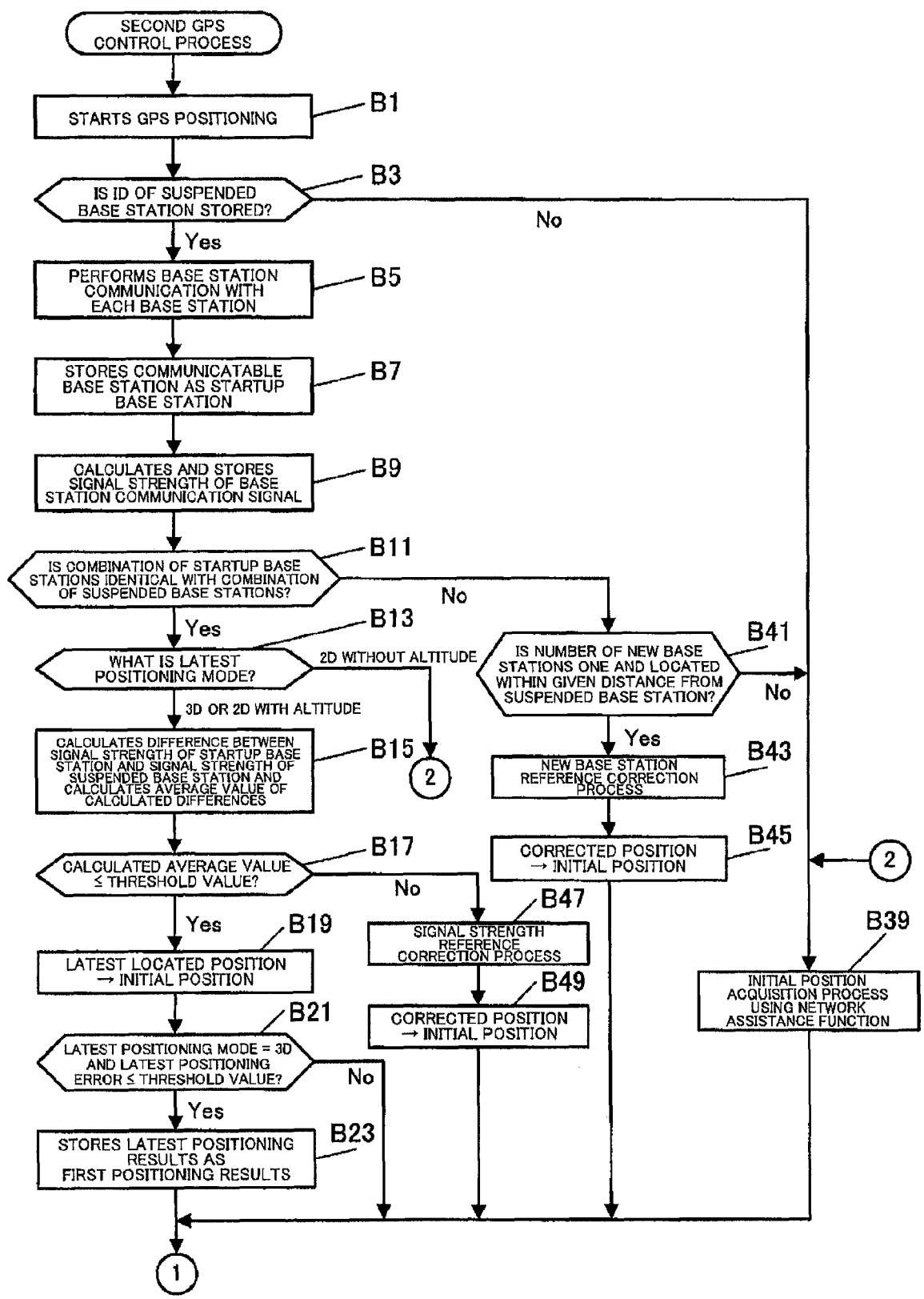
FIG. 13 is a flowchart showing the flow of a second GPS control process.
Figure 14:
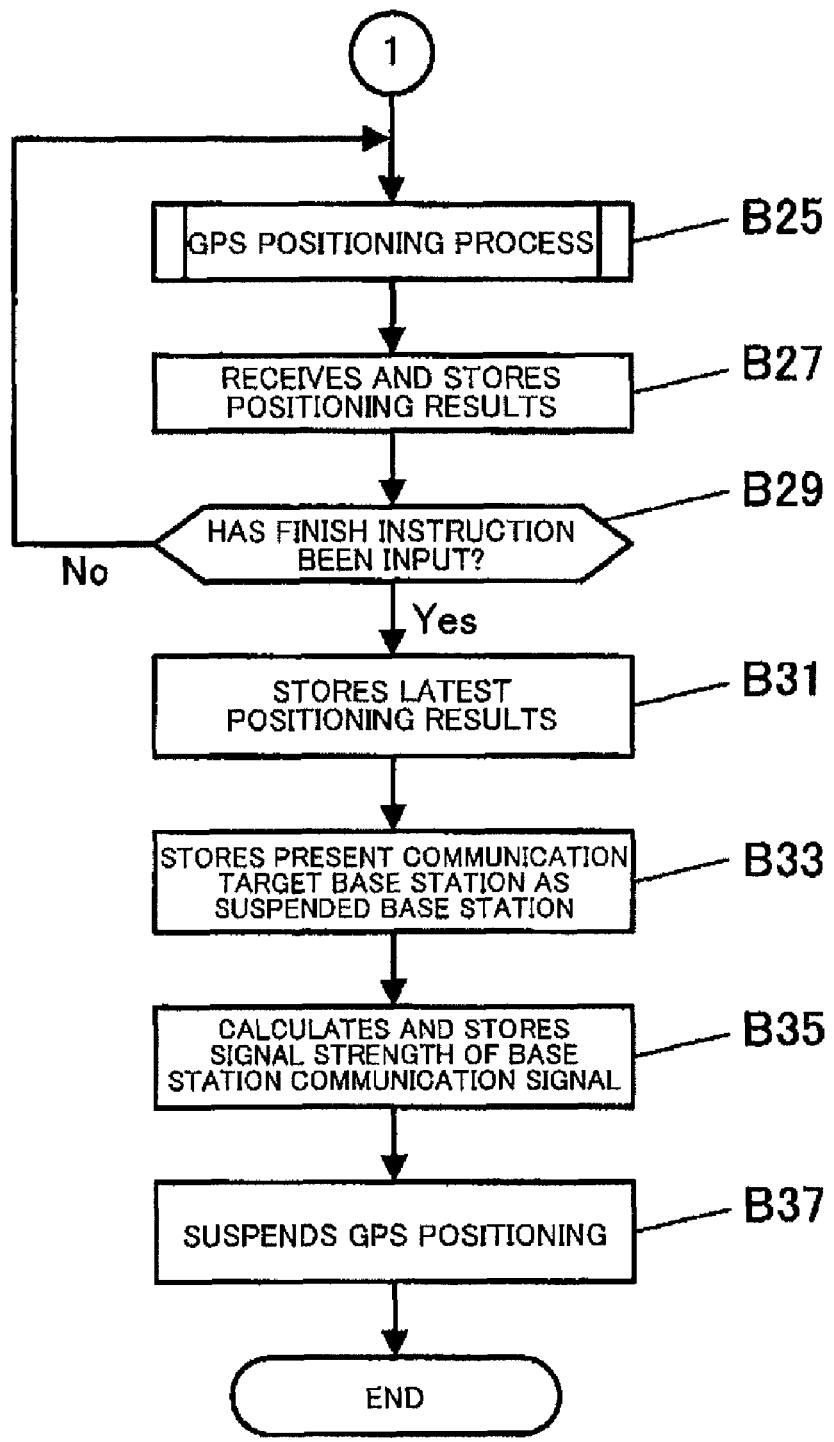
FIG. 14 is a flowchart showing the flow of a second GPS control process.

FIGS. 13 and 14 are flowcharts showing the flow of the second GPS control process performed by the portable telephone 1 by causing the host CPU 30 to read and execute the second GPS control program 821 stored in the flash ROM 82.

The host CPU 30 activates the GPS receiver section 10 (step B1). The host CPU 30 determines whether or not the suspended base station ID 8291 is stored as the second suspended base station data 829 in the flash ROM 82 (step B3).

When the host CPU 30 has determined that the suspended base station ID 8291 is stored (step B3: Yes), the host CPU 30 performs base station communication with each base station (step B5).

The host CPU 30 determines the base station with which the host CPU 30 can perform base station communication in the step B5 to be the startup base station, and stores the ID 9231 of the startup base station as the second startup base station data 923 in the RAM 92 (step B7). The host CPU 30 calculates the signal strength 9233 of the base station communication signal received from the base station with which the host CPU 30 can perform base station communication in the step B5, and stores the signal strength 9233 as the second startup base station data 923 while associating the signal strength 9233 with the ID 9231 of the startup base station (step B9).

The host CPU 30 determines whether or not the combination of the startup base stations stored as the second startup base station data 923 is identical with the combination of the suspended base stations stored as the second suspended base station data 829 (step B11). When the host CPU 30 has determined that the combinations of the stations are identical (step B11: Yes), the host CPU 30 determines the latest positioning mode 8271 stored as the second latest positioning data 827 in the flash ROM 82 (step B13).

When the host CPU 30 has determined that the latest positioning mode 8271 is "2D without altitude" in the step B13 (step B13: 2D without altitude), the host CPU 30 transitions to a step B39.

When the host CPU 30 has determined that the latest positioning mode 8271 is "3D" or "2D with altitude" (step B13: 3D or 2D with altitude), the host CPU 30 calculates the difference between the signal strength 9233 of the startup base station stored as the second startup base station data 923 and the signal strength 8293 of the suspended base station stored as the second suspended base station data 829 for each base station, and calculates an average value of the calculated differences (step B15).

The host CPU 30 determines whether or not the average value of the difference in signal strength is equal to or less than a given threshold value (step B17). When the host CPU 30 has determined that the average value is equal to or less than the threshold value (step B17: Yes), the host CPU 30 estimates the latest located position 8273 stored as the second latest positioning data 827 in the flash ROM 82 to be the present position of the portable telephone 1, and sets the estimated present position to be the initial position (step B19).

When the combinations of the startup base stations and the suspended base stations are the same and the difference in the signal strength of the base station communication signal between during suspension and during startup is small, the portable telephone 1 has been at a standstill or has moved to only a small extent after the time when the GPS positioning operation has been suspended. When the latest positioning mode is "3D" or "2D with altitude", the calculation accuracy during the preceding positioning is high. Therefore, only when these conditions are satisfied, the final located position obtained during the preceding positioning is estimated to be the present position of the portable telephone 1 and set to be the initial position.

The host CPU 30 determines whether or not the latest positioning mode 8271 stored as the second latest positioning data 827 is "3D" and the latest positioning error 8275 is equal to or less than a given threshold value (step B21). When the host CPU 30 has determined that these conditions are not satisfied (step B21: No), the host CPU 30 transitions to a step B25.

When the host CPU 30 has determined that the conditions are satisfied in the step B21 (step B21: Yes), the host CPU 30 stores the latest positioning results stored as the second latest positioning data 827 in the flash ROM 82 as the second positioning data 921 in the RAM 92 (first positioning results) (step B23).

When the latest positioning mode is "3D" and the latest positioning error is small, the reliability of the preceding positioning results is extremely high. In this case, the latest positioning results are considered to be the first positioning results after GPS startup and are used for various processes (e.g., map matching process).

The host CPU 30 then performs the GPS positioning process by causing the GPS receiver section 10 to perform positioning calculations based on the initial position which has been set (step B25). In the GPS positioning process, the GPS receiver section 10 calculates the position error range included in the located position while performing positioning calculations.

The host CPU 30 receives the positioning results from the GPS receiver section 10, and stores the positioning results as the positioning mode 9211, the located position 9213, and the positioning error 9215 of the second positioning data 921 in the RAM 92 as new data (step B27). The host CPU 30 determines whether or not the positioning finish instruction has been input using the operation section 40 (step B29). When the host CPU 30 has determined that the positioning finish instruction has not been input (step B29: No), the host CPU 30 returns to the step B25.

When the host CPU 30 has determined that the positioning finish instruction has been input in the step B29 (step B29: Yes), the host CPU 30 stores the positioning results for the latest record stored as the second positioning data 921 as the second latest positioning data 827 (latest positioning results) to update the second latest positioning data 827 (step B31).

The host CPU 30 determines the present communication target base station to be the suspended base station, and stores the ID 8291 of the suspended base station as the second suspended base station data 829 in the flash ROM 82 (step B33). The host CPU 30 calculates the signal strength 8293 of the base station communication signal from the base station during base station communication, and stores the signal strength 8293 as the second suspended base station data 829 while associating the signal strength 8293 with the ID 8291 of the suspended base station (step B35). The host CPU 30 suspends the operation of the GPS receiver section 10 (step B37), and finishes the second GPS control process.

When the host CPU 30 has determined that the ID 8291 of the suspended base station is not stored in the step B3 (step B3: No), the host CPU 30 performs an initial position acquisition process using a network assistance function (step B39). The initial position acquisition process is the same as described in the step A27 of the GPS startup process shown in FIG. 7. The host CPU 30 transitions to the step B25.

When the host CPU 30 has determined that the combinations of the base stations are not identical in the step B11 (step B11: No), the host CPU 30 determines whether or not the number of base stations newly added as the startup base station (hereinafter referred to as "new base station") is one and the new base station is located within a given distance (e.g., 1 km) from an arbitrary suspended base station referring to the base station data 803 stored in the flash ROM 82 (step B41).

When the host CPU 30 has determined that these conditions are not satisfied (step B41: No), the host CPU 30 transitions to the step B39. When the host CPU 30 has determined that the conditions are satisfied (step B41: Yes), the host CPU 30 performs a new base station reference correction process based on the base station data 803 to correct the latest located position 8273 stored as the second latest positioning data 827 based on the installation location of the new base station (step B43).

Figure 15:
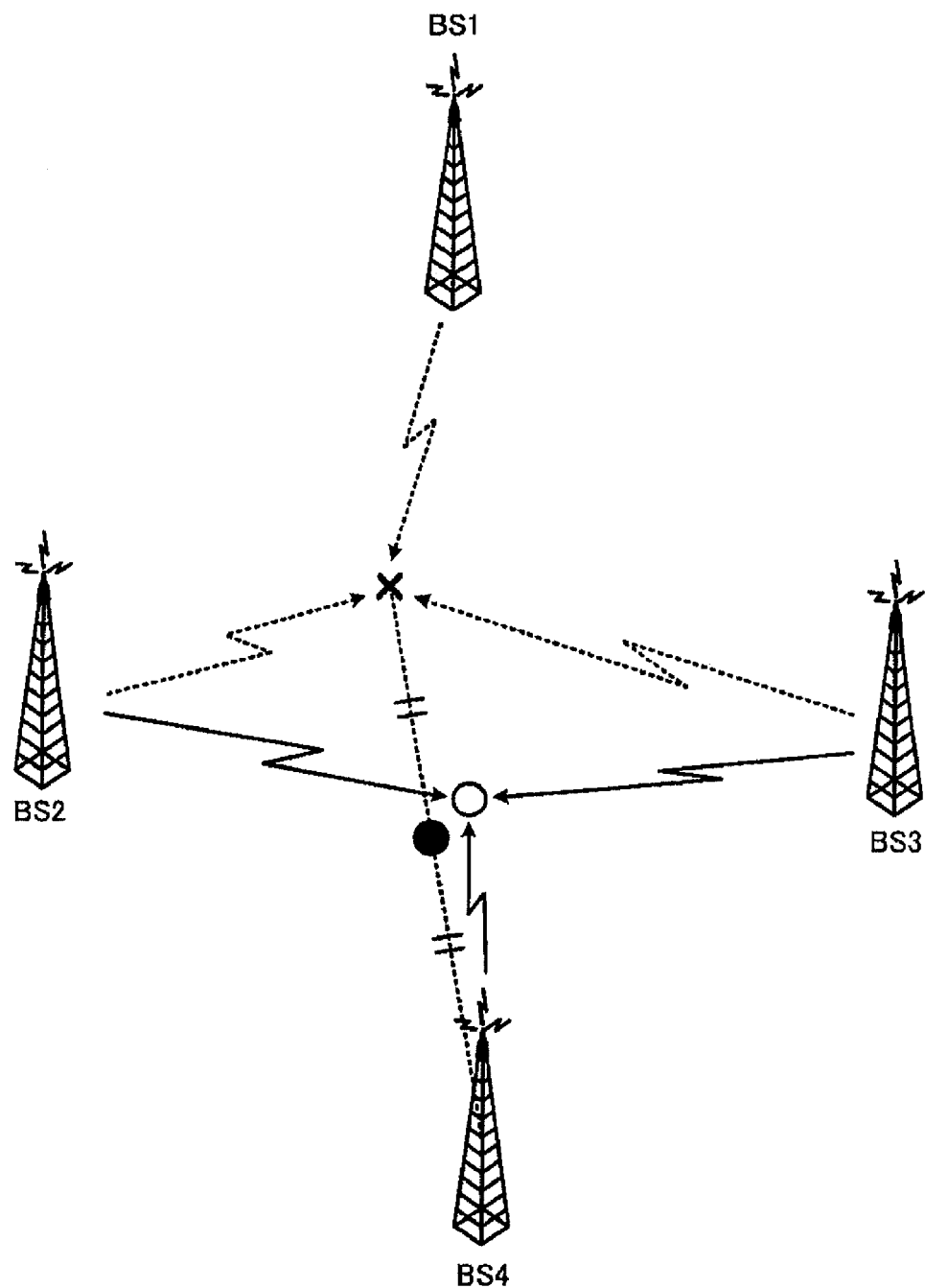
FIG. 15 is a view illustrative of the principle of position correction in a new base station reference correction process.

FIG. 15 is a view illustrative of the principle of position correction in the new base station reference correction process.

Suppose that the base stations (suspended base stations) positioned within the communication area when the GPS positioning operation has been suspended are "BS1", "BS2", and "BS3", and the base stations (startup base stations) positioned within the communication area when the GPS positioning operation has been started are "BS2", "BS3", and "BS4". In this case, the base station "BS4" is added as a new base station. The installation location of the new base station "BS4" is within a given distance from the installation location of the suspended base station "BS3".

In this case, since the new base station is the base station "BS4" (one) and the new base station "BS4" is located within a given distance from the suspended base station "BS3", the conditions in the step B41 are satisfied. Therefore, the latest located position is corrected based on the installation location of the new base station "BS4". Specifically, a line segment which connects the latest located position and the installation location of the new base station "BS4" is determined, and the latest located position is corrected to the midpoint of the line segment.

This embodiment is described taking an example in which the number of new base stations is one. When the number of new base stations is two or more, the latest located position can be similarly corrected by calculating the corrected position by averaging the installation locations of the new base stations.

After correcting the latest located position 8273 in the step B43, the host CPU 30 estimates the corrected position to be the present position of the portable telephone 1, and sets the estimated present position to be the initial position (step B45). The host CPU 30 then transitions to the step B25.

When the host CPU 30 has determined that the average value of the difference in signal strength exceeds the threshold value in the step B17 (step B17: Yes), the host CPU 30 performs a signal strength reference correction process referring to the base station data 803 stored in the flash ROM 82 to correct the latest located position 8273 stored as the second latest positioning data 827 based on the signal strength of each of the startup base stations and the suspended base stations (step B47).

Figure 16:
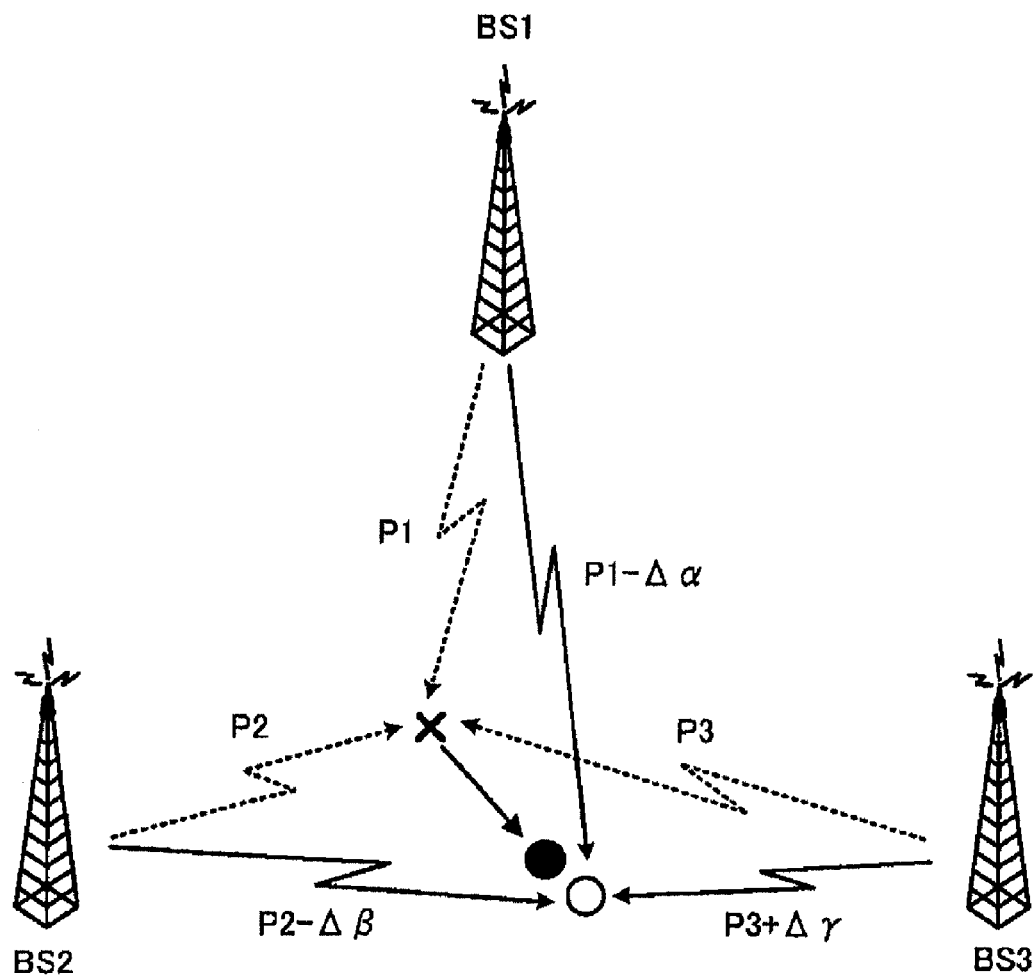
FIG. 16 is a view illustrative of the principle of position correction in a signal strength reference correction process.

FIG. 16 is a view illustrative of the principle of position correction in the signal strength reference correction process.

The following description is given on the assumption that the startup base stations and the suspended base stations are "BS1", "BS2", and "BS3". Suppose that the signal strengths of the base station communication signals received from the suspended base stations when the GPS positioning operation has been suspended are "P1", "P2", and "P3", and the signal strengths of the base station communication signals received from the startup base stations when the GPS positioning operation has been started are "P1-Δα", "P2-Δβ", and "P3-Δγ". The differences in signal strength "Δα", "Δβ", and "Δγ" are positive values.

In this case, the latest located position is corrected based on an increase or decrease from the signal strengths "P1", "P2", and "P3" and a ratio (Δα/P1):(Δβ/P2):(Δγ/P3) based on the differences in signal strength. Specifically, the latest located position is changed to become closer to the base station for which the signal strength is increased (+). As a result, the final located position obtained during the preceding positioning is corrected to a position near the base station "P3" for which the signal strength is increased by "Δγ".

After correcting the latest located position 8273 in the step B47, the host CPU 30 estimates the corrected position to be the present position of the portable telephone 1, and sets the estimated present position to be the initial position (step B49). The host CPU 30 then transitions to the step B25.

2-3. Effects

According to the second embodiment, when the combination of the startup base stations with which the portable telephone wireless communication circuit section 70 is communicating is the same as the combination of the suspended base stations stored in the flash ROM 82 and the average value of the difference in the signal strength of the base station communication signal received from each base station is equal to or less than a given threshold value, the latest located position stored in the flash ROM 82 is estimated to be the present position of the portable telephone 1 and set to be the initial position during the first positioning when starting the GPS positioning operation. When the combinations of the base stations are identical but the average value of the difference in signal strength exceeds a given threshold value, the latest located position is corrected based on the signal strengths of the suspended base stations and the startup base stations, and the present position is estimated.

When the combination of the base stations during the preceding positioning coincides with the combination of the present communication target base stations and the signal strength of the base station communication signal received from each base station is close between the preceding positioning time and the present time, it is considered that the portable telephone 1 has not moved after the preceding positioning. However, even if the combinations of the base stations coincide, it is likely that the portable telephone 1 has moved after the preceding positioning when the signal strength differs to a large extent. In this case, the initial position can be appropriately set taking the movement of the portable telephone 1 into consideration by estimating the present position by correcting the latest located position.

In the second embodiment, when it is determined that the combinations of the base stations partially coincide, the position information relating to the base station which is the startup base station and is not the suspended base station stored in the flash ROM 82 is read from the base station data 803. The latest located position stored in the flash ROM 82 is corrected based on the acquired position information, and the present position is estimated.

When the combinations of the base stations do not coincide, it is considered that the portable telephone 1 has moved to a large extent after the preceding positioning. On the other hand, when the combinations of the base stations partially coincide, it is considered that the portable telephone 1 is located at a position relatively close to the position during the preceding positioning. In this case, the initial position can be set even if the portable telephone 1 has moved to a large extent by correcting the final located position obtained during the preceding positioning based on the position information relating to the new base station to estimate the present position.

3. Modification

3-1. Mobile Terminal

The invention may be similarly applied to a personal handy-phone system (PHS) in addition to a portable telephone.

3-2. Satellite Positioning System

The above embodiments have been described taking the GPS as an example of the satellite positioning system. Note that the invention may also be applied to other satellite positioning systems such as the wide area augmentation system (WAAS), the Quasi Zenith Satellite System (QZSS), the Global Navigation Satellite System (GLONASS), and the GALILEO.

3-3. Separation of Process

The baseband process circuit section 13 may perform some or all of the processes performed by the host CPU 30. In this case, the CPU of the baseband process circuit section 13 estimates the present position of the portable telephone 1 by determining whether or not the startup base stations and the suspended base stations are the same, determining the difference in the signal strength of the base station communication signal received from the base station, or determining the latest positioning mode based on the base station communication signal received from the base station during base station communication, for example. The CPU performs positioning calculations using the estimated present position as the initial position, and outputs the positioning results to the host CPU 30.

In this case, when the CPU has determined that (1) the combinations of the startup base stations and the suspended base stations coincide, (2) the difference in the signal strength of the base station communication signal received from each base station is equal to or less than the threshold value, (3) the latest positioning mode is "3D", and (4) the latest positioning error is equal to or less than the threshold value, the CPU outputs the latest positioning results to the host CPU 30 before starting positioning calculations. This enables the host CPU 30 to use the latest positioning results as the first positioning results after the GPS positioning operation has been started.

The host CPU 30 may perform positioning calculations instead of the baseband process circuit section 13. In this case, the baseband process circuit section 13 acquires and extracts the GPS satellite signal from the IF signal output from the RF receiver circuit section 11, extracts the navigation message and the time information, and outputs the navigation message and the time information to the host CPU 30. The host CPU 30 performs pseudo-range calculations and positioning calculations based on the information input from the baseband process circuit section 13.

3-4. Femto Cell Base Station

The base stations of the portable telephone 1 include a large base station which covers an area with a radius of about one to several kilometers and a small base station which covers a small area (femto cell). The femto cell base station is a base station which covers an area with a radius of about several meters. The femto cell base station is installed in a home or a small office/home office (SOHO). Since the communicatable distance of the femto cell base station is short, when the base station with which the portable telephone 1 can communicate by performing base station communication is a femto cell base station, the position of the femto cell base station may be regarded as the position of the portable telephone 1. Therefore, when an identical femto cell base station is included in the startup base stations and the suspended base stations (note that the number of startup base stations and the number of suspended base station may be one, and the startup base station and the suspended base station may be an identical femto cell base station), the position of the femto cell base station may be output as the located position (present position).

Whether or not the base station with which the portable telephone 1 can communicate is a femto cell base station is determined based on the base station ID received from the base station during base station communication. In this case, determination may be made based on a bit of the ID which indicates the type of base station or the information stored as the base station data 803.

Figure 17:
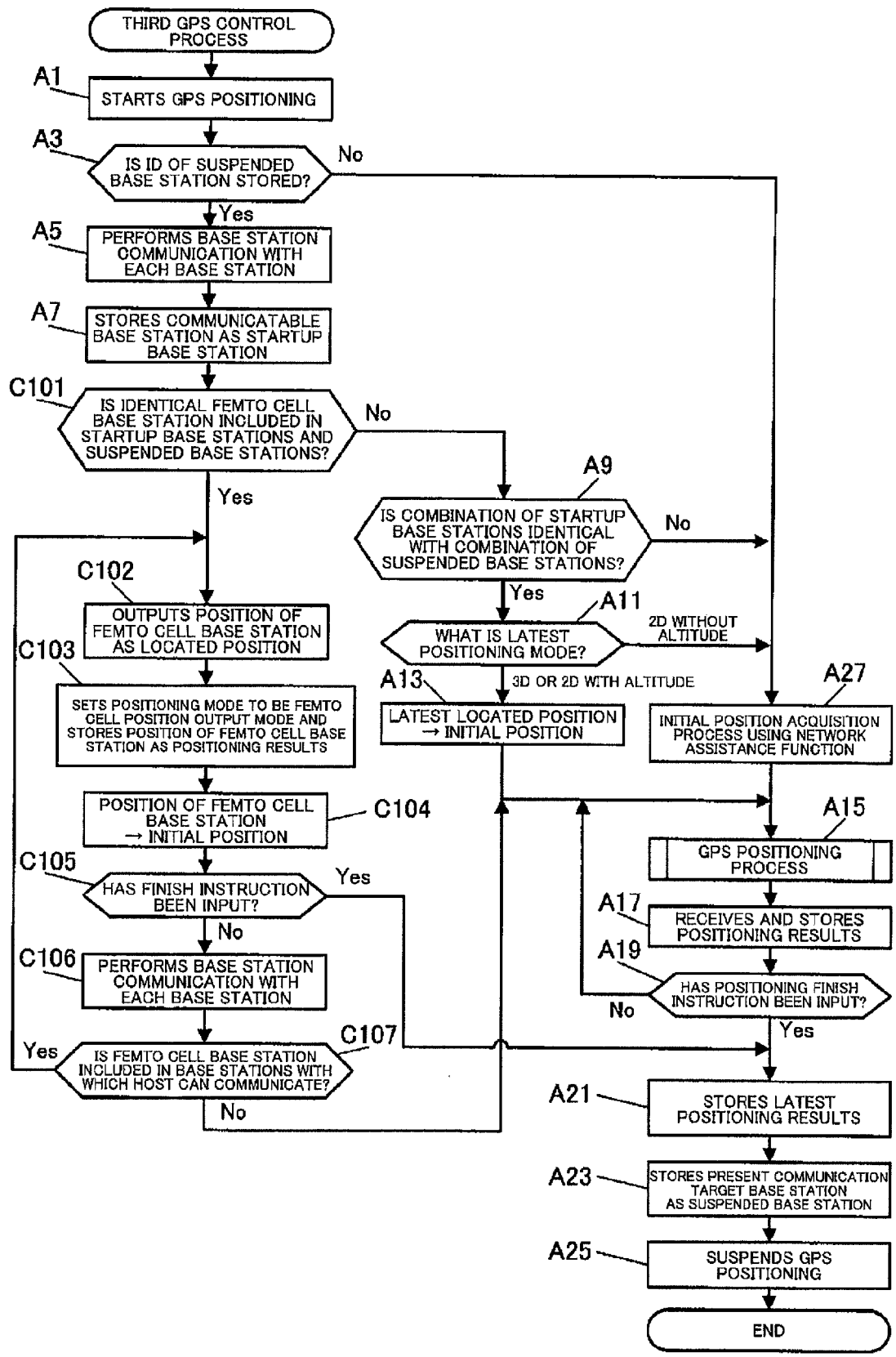
FIG. 17 is a flowchart showing the flow of a third GPS control process.

Specifically, the GPS control process shown in FIG. 7 may modified to a third GPS control process shown in FIG. 17. The third GPS control process shown in FIG. 17 differs from the GPS control process shown in FIG. 7 in that steps C101 to C107 are added. Specifically, after the process in the step A7, the host CPU 30 determines whether or not an identical femto cell base station is included in the startup base stations and the suspended base stations (step S101).

When an identical femto cell base station is not included (step S101: No), the host CPU 30 transitions to the step A9. When an identical femto cell base station is included (step S101: Yes), the host CPU 30 reads the position of the femto cell base station from the base station data 803, and outputs the position of the femto cell base station as the located position (step S102). The host CPU 30 sets the positioning mode 9011 to be a femto cell position output mode, and stores the located position 9013 as the positioning data 901 as the position of the femto cell base station (step C103). The host CPU 30 sets the position of the femto cell base station to be the initial position (step C104).

The host CPU 30 determines whether or not the positioning finish instruction has been input using the operation section 40 (step C105). When the host CPU 30 has determined that the positioning finish instruction has been input (step C105: Yes), the host CPU 30 transitions to the step A21. When the host CPU 30 has determined that the positioning finish instruction has not been input (step C105: No), the host CPU 30 performs base station communication with each base station (step C106), and determines whether or not a femto cell base station is included in the base stations with which the host CPU 30 can communicate (step C107). When a femto cell base station is included (step C107: Yes), the host CPU 30 returns to the step C102, and repeats the process in the steps C102 to C107. When a femto cell base station is not included, the host CPU 30 transitions to the step A15 and performs the GPS positioning process (step A15).

According to the above process, when an identical femto cell base station is included in the startup base stations and the suspended base stations, the position of the femto cell base station can be output as the located position (present position) without performing the GPS positioning process. When it is possible to perform base station communication with the femto cell base station, the position of the femto cell base station can be output as the located position (present position)

without performing the GPS positioning process. It is also possible to incorporate the steps C101 to C107 in the second GPS control process shown in FIG. 13. In this case, the steps C101 to C107 may be incorporated after the step B7.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A present position estimation method that estimates a present position of a mobile terminal, the mobile terminal including a positioning section that receives a satellite signal from a positioning satellite and locates the present position, and a wireless communication section that performs wireless communication with base stations installed in various locations while performing a hand-over process, the method comprising:

storing a final located position that has been located by the positioning section and a combination of base stations that have performed the wireless communication with the wireless communication section when the positioning section finishes positioning;

comparing a combination of base stations that currently perform wireless communication with the wireless communication section with the stored combination of the base stations when the positioning section again starts positioning; and estimating the stored final located position to be the present position of the mobile terminal when it has been determined that the combination of the base stations that currently perform the wireless communication with the wireless communication section coincides with the stored combination of the base stations.

2. The present position estimation method as defined in claim 1, wherein the base stations includes femto cell base stations;

the comparing includes determining whether or not same femto cell base stations are included in the base stations that currently perform wireless communication with the wireless communication section and the base stations that have been stored, or whether or not the base station that currently performs wireless communication with the wireless communication section and the base station that has been stored are the same femto cell base station; and when it has been determined that same femto cell base stations are included in the base stations that currently perform wireless communication with the wireless communication section and the base stations that have been stored, or the base station that currently performs wireless communication with the wireless communication section and the base station that has been stored are the same femto cell base station, the estimating of the present position includes reading position information relating to the same femto cell base station from a storage section that stores position information relating to a base station that can perform wireless communication with the wireless communication section, and estimating a position indicated by the read position information to be the present position of the mobile terminal.

3. The present position estimation method as defined in claim 2, when the mobile terminal can communicate with the same femto cell base station or another femto cell base station after estimating a position of the same femto cell base station to be the present position of the mobile terminal, the method further includes estimating a position of the femto cell base station that can communicate with the mobile terminal to be the present position of the mobile terminal as long as the mobile terminal can communicate with the same or another femto cell base station.

4. The present position estimation method as defined in claim 1, wherein the estimating of the present position includes reading position information relating to a base station that is a base station that currently performs wireless communication with the wireless communication section and excludes the stored base stations from a storage section that stores position information relating to base stations that can perform wireless communication with the wireless communication section when it has been determined that the combinations of the base stations are partially identical, and correcting the stored located position using the read position information to estimate the present position.

5. A program causing a computer to execute the present position estimation method as defined in claim 1, the computer being a mobile terminal that includes a positioning section that receives a satellite signal from a positioning satellite and locates a present position, and a wireless communication section that performs wireless communication with base stations installed in various locations while performing a hand-over process.

6. A present position estimation method that estimates a present position of a mobile terminal, the mobile terminal including a positioning section that receives a satellite signal from a positioning satellite and locates the present position, and a wireless communication section that performs wireless communication with base stations installed in various locations while performing a hand-over process, the method comprising:

storing a final located position that has been located by the positioning section, a base station that has performed wireless communication with the wireless communication section, and a radio wave state between the mobile terminal and the base station when the positioning section finishes positioning;

comparing a base station that currently performs wireless communication with the wireless communication section and a radio wave state between the mobile terminal and the base station that currently performs wireless communication with the wireless communication section with the base station and the radio wave state that have been stored; and estimating the stored final located position to be the present position of the mobile terminal when it has been determined that the base station that currently performs wireless communication with the wireless communication section and the radio wave state between the mobile terminal and the base station that currently performs wireless communication with the wireless communication section coincide with the base station and the radio wave state that have been stored, the comparing including determining that the base station that currently performs wireless communication with the wireless communication section and the radio wave state between the mobile terminal and the base station that currently performs wireless communication with the wireless communication section coincide with the base station and the radio wave state that have been stored when the base station that currently performs wireless communication with the wireless communication section is the same as the stored base station and a difference in the radio wave state satisfies a given approximation condition, the estimating of the present position including correcting the stored final located position and estimating the present position based on the stored radio wave state between the mobile terminal and the base station and the present radio wave state when it has been determined that the base station that currently performs wireless communication with the wireless communication section is the same as the stored base station and the difference in the radio wave state does not satisfy the given approximation condition.

7. A present position estimation method that estimates a present position of a mobile terminal, the mobile terminal including a positioning section that receives a satellite signal from a positioning satellite and locates the present position, and a wireless communication section that performs wireless communication with base stations installed in various locations while performing a hand-over process, the method comprising:

causing the positioning section to locate a position while changing calculation accuracy corresponding to a reception state of the satellite signal;

storing a final located position that has been located by the positioning section and the calculation accuracy of the positioning section when the positioning section finishes positioning;

determining whether or not the stored calculation accuracy satisfies a given accuracy condition when the positioning section again starts positioning; and estimating the stored final located position to be the present position of the mobile terminal when it has been determined that the stored calculation accuracy satisfies the given accuracy condition.

8. A positioning method that is performed by a positioning section of a mobile terminal that includes the positioning section that receives a satellite signal from a positioning satellite and locates a present position, and a wireless communication section that performs wireless communication with base stations installed in various locations while performing a hand-over process, the method comprising:

locating a position based on the received satellite signal using the present position estimated by the present position estimation method as defined in claim 1 as an initial position.

9. A program causing a computer to execute the present position estimation method as defined in claim 8, wherein the computer is a mobile terminal that includes a positioning section that receives a satellite signal from a positioning satellite and locates a present position, and a wireless communication section that performs wireless communication with base stations installed in various locations while performing a hand-over process.

10. A mobile terminal comprising:

a positioning section that receives a satellite signal from a positioning satellite and locates a present position;

a wireless communication section that performs wireless communication with base stations installed in various locations while performing a hand-over process;

a storage control section that stores a final located position that has been located by the positioning section and a combination of base stations that have performed wireless communication with the wireless communication section when the positioning section finishes positioning;

a comparison section that compares a combination of base stations that currently perform wireless communication with the wireless communication section with the combination of the base stations stored in the storage control section; and a present position estimation section that estimates the final located position stored in the storage control section to be the present position of the mobile terminal when the comparison section has determined that the combination of base stations that currently perform wireless communication with the wireless communication section with the combination of the base stations stored in the storage control section.

11. The mobile terminal as defined in claim 10, wherein the base stations includes femto cell base stations;

the comparison section includes a femto cell base station determination section that determines whether or not same femto cell base stations are included in the base stations that currently perform wireless communication with the wireless communication section and the base stations that are stored in the storage control section, or whether or not the base station that currently performs wireless communication with the wireless communication section and the base station stored in the storage control section are the same femto cell base station; and when the cell base station determination section has been determined that same femto cell base stations are included in the base stations that currently perform wireless communication with the wireless communication section and the base stations that have been stored, or the base station that currently performs wireless communication with the wireless communication section and the base station stored in the storage control section are the same femto cell base station, the present position estimation section reading position information relating to the same femto cell base station from a storage section that stores position information relating to base stations that can perform wireless communication with the wireless communication section, and estimating a position indicated by the read position information to be the present position of the mobile terminal.

12. The mobile terminal as defined in claim 10, wherein the storage control section includes a position information storage control section that stores position information relating to base stations that can perform wireless communication with the wireless communication section; and the present position estimation section includes a second correction-estimation section that reads and acquires position information relating to a base station that is a base station that currently performs wireless communication with the wireless communication section and excludes the base stations stored in the storage control section from the position information storage control section when the comparison section has determined that the combinations of the base stations are partially identical, and corrects the located position stored in the storage control section using the acquired position information to estimate the present position.

13. A mobile terminal comprising:

a positioning section that receives a satellite signal from a positioning satellite and locates a present position;

a wireless communication section that performs wireless communication with base stations installed in various locations while performing a hand-over process;

a storage control section that stores a final located position that has been located by the positioning section, a base station that has performed wireless communication with the wireless communication section, and a radio wave state between the mobile terminal and the base station when the positioning section finishes positioning;

a comparison section that compares a base station that currently performs wireless communication with the wireless communication section and a radio wave state between the mobile terminal and the base station that currently performs wireless communication with the wireless communication section with the base station and the radio wave state that are stored in the storage control section; and a present position estimation section that estimates the final located position stored in the storage control section to be the present position of the mobile terminal when the comparison section has been determined that the base station that currently performs wireless communication with the wireless communication section and the radio wave state between the mobile terminal and the base station that currently performs wireless communication with the wireless communication section coincide with the base station and the radio wave state stored in the storage control section, the comparison section determining that the base station that currently performs wireless communication with the wireless communication section and the radio wave state between the mobile terminal and the base station that currently performs wireless communication with the wireless communication section coincide with the base station and the radio wave state stored in the storage control section when the base station that currently performs wireless communication with the wireless communication section is the same as the base station and the radio wave state stored in the storage control section a difference in the radio wave state satisfies a given approximation condition, the present position estimation section including a first correction-estimation section that corrects the located position stored in the storage control section to estimate the present position based on the radio wave state between the mobile terminal and the base station stored in the storage control section and a present radio wave state when the comparison section has been determined that the base station that currently performs wireless communication with the wireless communication section is the same as the base station stored in the storage control section and the difference in the radio wave state does not satisfy the given approximation condition.

14. A mobile terminal comprising:

a positioning section that receives a satellite signal from a positioning satellite and locates a present position, the positioning section locating a position while changing calculation accuracy corresponding to a reception state of the satellite signal;

a wireless communication section that performs wireless communication with base stations installed in various locations while performing a hand-over process;

a storage control section that stores a final located position that has been located by the positioning section and the calculation accuracy of the positioning section when the positioning section finishes positioning;

a positioning accuracy determination section that determines whether or not the calculation accuracy stored in the storage control section satisfies a given accuracy condition; and a present position estimation section that estimates the final located position stored in the storage control section to be the present position of the mobile terminal when the positioning accuracy determination section has determined that the calculation accuracy stored in the storage control section satisfies the given accuracy condition.

* * * * *